United States Patent
Garro et al.

(10) Patent No.: US 6,211,271 B1
(45) Date of Patent: Apr. 3, 2001

(54) PROCESS FOR PRODUCING A VULCANIZABLE RUBBER COMPOSITION INCLUDING CARBON BLACK-BASED AND SILICA-BASED REINFORCING FILLERS

(75) Inventors: Luciano Garro, Ornago; Angela Amaddeo, Arienzo; Roberto Pessina, Paderno Dugnano, all of (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/352,790

(22) Filed: Jul. 14, 1999

Related U.S. Application Data
(60) Provisional application No. 60/094,822, filed on Jul. 31, 1998.

(30) Foreign Application Priority Data

Jul. 15, 1998 (EP) .................................................. 98830434

(51) Int. Cl.[7] .............................. C08J 5/24; C08F 210/16
(52) U.S. Cl. .................. 524/269; 525/331.7; 525/331.8; 525/332.1; 525/332.5; 525/332.6; 525/332.8; 525/332.9; 525/333.1; 525/333.2; 525/359.1; 525/371; 524/493; 524/495; 524/496; 524/502; 524/572; 524/574; 524/575.5; 524/576
(58) Field of Search ............................ 525/331.7, 331.8, 525/332.1, 332.5, 332.6, 332.8, 332.9, 333.1, 333.2, 359.1, 371; 524/269, 493, 495, 496, 502, 572, 574, 575.5, 576

(56) References Cited

U.S. PATENT DOCUMENTS

| | | |
|---|---|---|
| 3,451,988 | 6/1969 | Lauger . |
| 4,264,753 | 4/1981 | Halasa et al. . |
| 4,550,142 | 10/1985 | Akita et al. . |
| 4,742,124 | 5/1988 | Tsutsumi et al. . |
| 5,227,425 | 7/1993 | Rauline . |

FOREIGN PATENT DOCUMENTS

| | | |
|---|---|---|
| 451 604 | 10/1961 | (EP) . |
| 447 066 | 9/1991 | (EP) . |
| 501 227 | 9/1992 | (EP) . |
| 0 763 558 | 3/1997 | (EP) . |
| 763 558 | 3/1997 | (EP) . |

OTHER PUBLICATIONS

Ayala, J.A. et al., "Comparison of the Elastomer Filler Interaction Between Chemically Modified and Emulsion SBR with Carbon Black and Silica Fillers", Paper No. 106 Presented(1995), pp. 1–11.

Primary Examiner—Samuel A. Acquah
(74) Attorney, Agent, or Firm—Finnegan, Henderson, Farabow, Garrett & Dunner. L.L.P.

(57) ABSTRACT

A process for producing a vulcanizable rubber composition containing silica and carbon black, comprises the step of intimately mixing at a temperature of from 130° to 180° C. at least a first cross-linkable unsaturated chain polymer with a first carbon black-based reinforcing filler, so as to obtain a first rubber composition capable of allowing a subsequent effective dispersion of a second silica-based reinforcing filler and of a second cross-linkable unsaturated chain polymer. The rubber composition thus obtained shows a homogeneous dispersion of the reinforcing fillers, in particular of the silica-based reinforcing filler, constant physical-mechanical characteristics, and improved drawability, and is particularly suitable for the manufacture of tire treads with low rolling resistance.

23 Claims, 1 Drawing Sheet

PROCESS FOR PRODUCING A VULCANIZABLE RUBBER COMPOSITION INCLUDING CARBON BLACK-BASED AND SILICA-BASED REINFORCING FILLERS

This application claims benefit to U.S. Provisional Ser. No. 60/094,822 filed Jul. 31, 1998.

DESCRIPTION

1. Background of the Invention

The present invention relates to a process for producing a vulcanizable rubber composition incorporating carbon black-based and silica-based reinforcing fillers dispersed in a cross-linkable unsaturated chain polymer base.

More particularly, the invention relates to a process for producing a vulcanizable rubber composition which has a preferred—though not exclusive—use in the production of treads for vehicle tires.

In the following description and in the subsequent claims, the term: cross-linkable unsaturated chain polymer base, is used to indicate any non cross-linked polymer or polymer mixture, either natural or synthetic, capable of assuming all the chemical-physical and mechanical characteristics typical of elastomers as a result of cross-linking (vulcanization) with sulfur-based systems.

In the same way, in the following description and in the subsequent claims the term: cross-linkable unsaturated chain polymer, is used to indicate any non cross-linked polymer, either natural or synthetic, capable of assuming all the chemical-physical and mechanical characteristics typical of elastomers as a result of cross-linking (vulcanization) with sulfur-based systems.

2. Prior art

In the field of vehicle tire manufacture one of the more difficult objects to be reached has always been that of reducing the rolling resistance of the tire, achieving at the same time a good wear resistance and a satisfactory skid resistance on wet road.

The difficulties for achieving the aforementioned object essentially arise from the fact that the tire rolling resistance on the one hand and the wear resistance and wet skid resistance on the other hand, are affected in an entirely opposite manner by the quantity of reinforcing filler, traditionally mainly constituted by carbon black, used in the rubber composition employed to manufacture the tread of the tire.

In order to reduce the rolling resistance of the tire, in fact, it would be desirable to reduce the quantity of the carbon black-based reinforcing filler used in the rubber composition (for instance, below 70 parts every 100 parts by weight of the polymer base of the rubber composition): in so doing, however, a falling off to unacceptable values of both wet skid resistance and wear resistance of the tire has been observed.

In order to overcome somehow this limitation of the rubber compositions comprising carbon black as main reinforcing filler, the prior art has suggested to partly or fully replace the latter by the so-called "white" fillers, in particular silica, as is described for instance in European Patent application EP 0 501 227.

Even though silica-based reinforcing fillers have allowed to reduce the tire rolling resistance without significantly affecting wear resistance and wet skid resistance, their use is not devoid of drawbacks.

A first severe drawback which has been observed by using reinforcing fillers entirely or mainly constituted by silica is associated to the difficulty of homogeneously and uniformly dispersing silica within the polymer base of the rubber composition. Actually, these reinforcing fillers have per se a poor affinity with the polymer base of the rubber compositions used in the manufacture of tires and require—as such—the use of suitable coupling agents that are able to chemically bind silica to the polymer matrix.

However, the need of using such coupling agents poses a limit to the maximum temperature that may be achieved during the steps of mixing and mechanically working the rubber composition, on pain of an irreversible thermal degradation of the coupling agent.

But the respect of the aforementioned temperature constraint involves a marked reduction in the very mechanical mixing action that is of the essential for an optimum dispersion of silica into the polymer matrix.

The ensuing insufficient and non homogeneous dispersion of silica in the rubber composition causes in turn several drawbacks essentially related to a decrease of the wear resistance and wet skid resistance characteristics, to an extreme variability and non homogeneity of the physical-mechanical characteristics of the rubber composition from zone to zone of the same.

More particularly, a remarkable drawing difficulty and a dimensional variability of the tread have been observed during the manufacture of treads obtained from rubber compositions including silica as main reinforcing filler.

In addition to these drawbacks, additional not negligible shortcomings constituted by a drastic increase in the volume electrical resistivity of the tire tread, which involves an undesired accumulation of electrostatic charges that may in some cases disturb the electronic apparatuses present on board of a vehicle or even cause sudden electrical discharges of high potential, and by an abrasive action of silica on the moving parts and, in general, on the body of the mixing apparatuses used in the production of the rubber composition, which causes an increase in maintenance costs, must also be added.

Lastly, it should be observed that by using reinforcing fillers entirely or mainly constituted by silica, the overall production cost of the finished tire increases to a not negligible extent either because of the much higher cost of silica compared to carbon black, and because of the need of using suitable and expensive coupling agents capable of chemically binding silica to the polymer matrix of the rubber composition.

In order to try to overcome the drawbacks related to the use of silica as main reinforcing filler, it has then been suggested to use both carbon black and silica, dispersing each of said fillers in a corresponding polymer, as disclosed by European Patent application EP-A-0 763 558.

In this way, a substantially heterogeneous rubber composition is obtained in which a first polymer phase wherein carbon black is mainly dispersed and a second polymer phase wherein silica is mainly dispersed may be distinguished.

By operating in accordance with the teaching of the aforesaid patent application, however, the above drawbacks related to difficulties of silica dispersion in its own polymer phase, are still worsened by the high quantities of silica to be used, in particular if low-molecular-weight, low-viscosity polymers are used, such as solution-SBR synthetic rubbers.

The ensuing non homogeneous silica dispersion adversely affects both the wear resistance and wet-skid resistance characteristics, and the physical-mechanical characteristics of the rubber composition from zone to zone of the same.

Furthermore, the necessary mechanical mixing action, essential for an optimum dispersion of silica in its own polymer phase, causes also in this case an undesired marked abrasion action on the body and on the moving parts of the mixing apparatuses, with an increase in maintenance costs.

SUMMARY OF THE INVENTION

The technical problem underlying the present invention is therefore that of providing a process for producing a vulcanizable rubber composition including carbon black-based and silica-based reinforcing fillers which is free from the drawbacks complained with reference to the cited prior art.

According to the invention, the aforesaid technical problem is solved by a process for producing a vulcanizable rubber composition, which is characterized in that it comprises the steps of:

a) intimately mixing at a temperature of from 130° to 180° C.:
  i) at least a first cross-linkable unsaturated chain polymer;
  ii) a first carbon black-based reinforcing filler, and optionally
  iii) one or more non cross-linking ingredients
so as to obtain a first rubber composition having a Mooney viscosity of from 70 to 140 Ms, wherein the first carbon black-based reinforcing filler is dispersed in a substantially homogeneous manner;

b) cooling the first rubber composition obtained from step a) to a temperature not exceeding 100° C., c) intimately mixing at a temperature of from 130° to 180° C.:
  i) the first high-viscosity rubber composition obtained from step b),
  ii) at least a second cross-linkable unsaturated chain polymer,
  iii) a second silica-based reinforcing filler, and optionally
  iv) one or more non cross-linking ingredients
so as to obtain a second rubber composition wherein the carbon black-based and silica-based reinforcing fillers are dispersed in a substantially homogeneous manner;

d) intimately mixing the second rubber composition thus obtained with a suitable vulcanizing system at a temperature lower than the vulcanization temperature.

According to the present invention, it has surprisingly been found that by carrying out the above sequence of serial incorporation steps of the fillers it is possible to homogeneously disperse both the reinforcing fillers throughout the polymeric matrix of the rubber composition, without suffering from the drawbacks that affect the processes of known type, first of all the difficulty of silica dispersion throughout the polymer base of the rubber composition.

More particularly, it has been found that the process of the invention allows to obtain—in clear contrast with the teachings of European Patent application EP-A-0 763 558—a rubber composition wherein distinct polymeric phases preferentially incorporating one of the reinforcing fillers cannot be identified any longer.

Advantageously, the process of the invention thus allows to achieve an improvement both in wear resistance and wet-skid resistance of the vulcanized rubber composition, and in the physical-mechanical homogeneity characteristics of the rubber composition from zone to zone of the same.

In the following description and in the subsequent claims, the term: homogeneously dispersed fillers, is used to indicate fillers such that the percentage of the same forming within the rubber composition aggregates having a size exceeding 7 $\mu$m is preferably lower than 1%.

In this case, optimum abrasion resistance characteristics of the vulcanized rubber composition have been observed.

The process of the invention also advantageously allows to obtain an optimum dispersion of the fillers, and in particular of the silica-based filler even without adopting during the manufacture of the rubber composition all those special precautions adapted to achieve low values of the projected mean area of the aggregates (7,000–8,400 nm$^2$), as taught by the above-identified European patent application EP-A- 501 227.

The Applicant supposes—without intending to limit in any way the scope of the invention—that the achievement of such advantageous characteristics should be ascribed to the fact that the first high-viscosity rubber composition obtained by intimately mixing the first polymer and the carbon black-based reinforcing filler would act in the subsequent incorporation step of the second silica-based filler as a kind of high-viscosity polymeric "dispersing agent" capable of suitably modifying the rheologic properties of the rubber composition, allowing to impart to the same higher shear stresses as compared to those achievable with the manufacturing processes of the prior art.

Preferably, step a) of the process according to the invention is carried out by imparting to the mixture of ingredients (at least a first cross-linkable unsaturated chain polymer, the first carbon black-based reinforcing filler, and optionally one or more non cross-linking ingredients) a mechanical work so as to achieve a temperature between 130° and 180° C., preferably in the order of 160° C.

Advantageously, the aforementioned high mixing temperature may be reached in an easy and rapid way in closed mixing apparatuses known per se and indicated in the art by the term of Banbury. In such apparatuses, in fact, the rubber composition which is being prepared undergoes to a mechanical work which, on account of its marked viscoelastic characteristics, causes its temperature to rise quickly within the range of values mentioned hereinabove.

Advantageously, using the mixing apparatuses of the above type, it is also possible to achieve said advantageous characteristics within a time period of from 2 to 6 minutes, preferably of about 4 minutes.

The time necessary to complete this first mixing step may vary within the above range of values depending upon the ingredients of the first rubber composition and upon the structural and functional characteristics of the mixing apparatus chosen.

According to the invention, a first rubber composition is so obtained, wherein the first carbon black-based reinforcing filler is dispersed in a substantially homogeneous manner, having a Mooney viscosity, measured according to the ISO standards 289-1 of from 70 to 140 Ms, and preferably, of from 100 to 120 Ms.

Such a rubber composition advantageously constitutes an effective polymeric dispersing agent capable of allowing the application of high shear stresses in the step of incorporating the second silica-based reinforcing filler, provided that it is cooled down below 100° C., as described hereinabove.

Preferably, said dispersing action is optimized by cooling the first rubber composition at a temperature not exceeding 80° C. and, still more preferably, not exceeding 40° C.

Preferably, step c) of the process according to the invention is carried out by imparting to the mixture of ingredients (the first high-viscosity rubber composition, the second silica-based reinforcing filler, at least one second cross-linkable unsaturated chain polymer, and optionally one or more non cross-linking ingredients) a mechanical work so as to achieve a temperature between 130° and 180° C., preferably in the order of 150° C.

Advantageously, using the mixing apparatuses of the above type, it is also possible to achieve the aforementioned advantageous characteristics within in a time interval of from 2 to 6 minutes, preferably of about 4 minutes.

The time necessary to complete this first mixing step may vary within the above range of values depending upon the ingredients of the first rubber composition and upon the structural and functional characteristics of the mixing apparatus chosen.

According to a preferred embodiment of the invention and if miscible polymers are used, it is advantageously possible to homogeneously disperse in the rubber composition not only the reinforcing fillers but also the polymeric phases, obtaining a final rubber composition which is substantially homogeneous.

For the purposes of the present invention, a rubber composition is considered to be substantially homogeneous when it shows, after vulcanization, a curve tangδ vs temperature, determined according to experimental methods known per se, having a peak closer to the mean weighed temperature among the glass transition temperatures ($T_g$) of the pure polymers constituting the polymer base of the rubber composition.

Preferably, in the process of the invention, step c) of intimate mixing between the first high-viscosity rubber composition incorporating the carbon black-based reinforcing filler and the other ingredients is carried out in such a way as to have in the second rubber composition 30 to 70 parts of the first cross-linkable unsaturated chain polymer and 70 to 30 parts of the second cross-linkable unsaturated chain polymer.

Still more preferably, the weight ratio between said polymers is of from 35/65 to 50/50.

In a further embodiment of the invention, and in order to link in the most stable manner the second silica-based reinforcing filler to the polymeric matrix of the rubber composition, the process preferably comprises an additional step e) of intimately mixing the second rubber composition obtained from step c) with at least one suitable silica coupling agent at a temperature of from 130° to 165° C.

In this embodiment, such additional step e) of intimate mixing should be controlled in such a way that the mechanical work imparted to the second rubber composition being formed achieves a temperature not exceeding 165° C., on pain of an irreversible thermal degradation of the coupling agent Preferably, the temperature of the rubber composition is controlled within a range of 130°–165° C. depending on the quantity of silica-based reinforcing filler added to the rubber composition and is, still more preferably, in the order of about 150° C.

According to the invention, at least 50% of the first carbon black-based reinforcing filler is preferably incorporated during said step a) of the process, while the remaining 50% is incorporated in at least one of steps c), d) and e).

In this way, the incorporation of optional liquid ingredients in the rubber composition is facilitated, whereby a better dispersion of the same as well as an advantageous reduction in the process time are obtained.

Preferably and in order to maximize the dispersing action of the first rubber composition with respect to silica, at least 70% and, still more preferably 100%, of the first carbon black-based reinforcing filler is incorporated in said step a) of the process.

As to the second silica-based reinforcing filler, the methods for incorporating the same in the rubber composition may vary depending on the total quantity of said filler.

It has been found, in fact, that when the quantity of silica to be incorporated in the rubber composition exceeds 50 phr, the addition and the intimate mixing of silica in two or more distinct steps markedly improves the dispersion of the same throughout the polymer base.

In this case, at least 50% of the second silica-based reinforcing filler is preferably incorporated during said step c) of the process, while the remaining 50% is incorporated in at least one of steps a), d) and e).

Alternatively and if the quantity of silica to be incorporated in the rubber composition is lower than 50 phr, it is possible to incorporate at least 70% and, still more preferably the 100%, of the second silica-based reinforcing filler in said step c) of the process.

According to the invention, the said steps c) and e) of incorporating and homogeneously dispersing the silica and of incorporating and reacting the silica with the coupling agent, may be carried out at different times and/or in different apparatuses, preferably after having discharged and cooled the rubber composition at the end of each step.

Alternatively, it is also possible to carry out the above mentioned mixing steps in a single mixing apparatus (Banbury or double-screw extruder), taking however care to reduce the temperature of the rubber composition down to a value of 100°–130° C., in such a way that at the end of said step the temperature of the rubber composition is within the aforesaid range of values (130°–165° C.), optimizing step e) of incorporating the coupling agent without inducing undesired interactions of the latter with the polymer base.

In a further embodiment of the invention, it is also advantageously possible to reduce the overall number of working steps of the process and production times, by simultaneously carrying out said mixing steps c) and e) and incorporating in the first rubber composition all the silica-based reinforcing filler during said step c) together with the coupling agent.

In this case, step c) of intimate mixing should be controlled in such a way that the mechanical work imparted to the second rubber composition being formed achieves a values not exceeding 165° C., on pain of an irreversible thermal degradation of the aforesaid coupling agent.

In a preferred embodiment of the invention, the total quantity of the carbon black-based first reinforcing filler must be such that the volume electrical resistivity of the final vulcanized rubber composition, measured according to UNI standards 4288-72, is not higher than $1 \times 10^{-6}$ Ohm×cm.

In this way, it is advantageously possible to manufacture with the rubber composition of the invention a vehicle tread having such resistivity characteristics as not to cause any substantial accumulation of electrostatic charges.

In order to ensure such volume resistivity values, the quantity of carbon black may be, depending on the type of black used, between 15 and 75 parts by weight per each 100 parts by weight of a polymer base including said at least one first and a second polymers (phr) and, still more preferably, between 30 and 50 phr.

In a further embodiment of the invention, it is also possible to reduce the quantity of carbon black down to 15–30 phr, using carbon blacks known per se having a high electrical conductivity, such as for instance the carbon blacks marketed by 3M under the trade name of ENSACO™.

The types of carbon blacks conventionally used in the art and usable in the rubber composition of the invention are those indicated according to ASTM standards under the designations N110, N121, N220, N231, N234, N242, N239, N299, N315, N236, N330, N332, N339, N347, N351, N358 and N375.

According to a preferred embodiment of the invention, furthermore, it has quite unexpectedly been found that thanks to the use of a carbon black-based reinforcing filler having particular characteristics of "structure" or aggregation degree of the particles and of surface area, it is possible to reduce the quantity of carbon-black, to the advantage of a reduced rolling resistance, while keeping the characteristics of wet skid resistance, wear resistance and volume electrical resistivity at more than satisfactory values.

As to the structure, it has been found that optimum results—with regard to wet skid resistance and wear resistance—may be obtained when the carbon black has a high "structure" (i.e. a high aggregation degree), which is however rather easily disgregable, producing aggregates having a lower structural complexity.

From the experimental point of view, these characteristics may be correlated to the capacity of carbon black of absorbing a particular sterically hindered molecule—namely, dibutylphthalate—and, respectively, to the reduction of said absorption capacity after a suitable mechanical action of controlled destructuration.

Based on such correlation, the higher is the "structure" of a carbon black, the greater is the absorption value of dibutylphthalate (in the following DBP absorption), while the more marked is the tendency to disgregate, the higher is the reduction of the DBP absorption value following controlled destructuration (in the following $\Delta$DBP).

The high structure carbon black of the invention shows— as such—a DBP absorption value, measured according to the standards ISO 4656-1, equal to at least 110 ml/100 g and a reduction in the DBP absorption value ($\Delta$DBP), measured after compression according to the standards ISO 6894, equal to at least 25 ml/100 g.

Preferably, the carbon black has a DBP absorption value, measured according to ISO 4656-1, of from 130 to 160 ml/100 g, and a reduction in the DBP absorption value ($\Delta$DBP), measured after compression according to ISO 6894, of from 30 to 50 ml/100 g.

As to the surface area, it has been found that optimum results—in terms of wet skid resistance and wear resistance—may be obtained when the carbon black of the invention has a limited surface area, i.e., when it is essentially constituted by rather coarse particles.

From the experimental point of view, the surface area characteristics of carbon black particles may be correlated to the capacity of absorbing a particular molecule, the cetyl-trimethyl ammonium bromide or CTAB.

Based on such correlation, the higher is surface area of a carbon black the greater is the absorption value of cetyl-trimethyl ammonium.

Owing to the inverse proportionality between surface area and particle size, there also ensues that the carbon black particles are the smaller the higher is the CTAB absorption value.

Preferably, the high structure carbon black of the invention has a surface area—as determined based on the absorption of cetyl-trimethyl ammonium according to the standards ISO 6810 (in the following CTAB absorption)—not greater than 120 m$^2$/g and, still more preferably, of from 70 to 100 m$^2$/g.

In a preferred embodiment of the invention, the total quantity of the second silica-based reinforcing filler is between 20 and 80 parts by weight per each 100 parts by weight of a polymer base including said at least one first and a second polymers (phr).

Preferably, the total quantity of the second silica-based reinforcing filler is such that the sum of said first and second reinforcing fillers is between 50 and 100 phr and, still more preferably, between 60 and 90 phr.

In a still more preferred embodiment, the weight ratio between the first carbon black-based reinforcing filler and the second silica-based reinforcing filler is between 30/70 and 60/40.

For the purposes of the invention, the second silica-based reinforcing filler may be of a type known per se, such as for instance of the type disclosed in European Patent application EP-A-0 501 227.

Preferably, the second silica-based reinforcing filler has a BET surface area between 100 and 300 m$^2$/g, a surface area measured by CTAB absorption according to ISO 6810 between 100 and 300 m$^2$/g, a DBP absorption value measured according to ISO 4656-1 between 150 and 250 ml/100 g.

For the sole purpose of simplifying the present description, the silica-based fillers of the invention will be indicated in the following by the term: silica.

As said above, the process of the invention preferably comprises the step of incorporating in the second rubber composition a suitable coupling agent that may chemically react with silica and bind the latter to the polymer base during vulcanization of the same.

Preferably the silica coupling agent is added to the rubber composition in a quantity of from 4 to 15 parts by weight per each 100 parts by weight of the second silica-based reinforcing filler.

Preferred coupling agents are silane-based and have the following structural formula:

$$(R)_3\text{—Si—}C_nH_{2n}X \tag{I}$$

wherein:

R is an alkyl or alkoxy group comprising 1 to 4 carbon atoms or a chlorine atom, n is an integer of from 1 to 6, and X is a group selected from —Si$_m$—C$_n$H$_{2n}$—Si—(R)$_3$, a nitroso group, a mercapto group, an amino group, an epoxy group, a vinyl group, an imido group, one atom of chlorine, or a S$_m$Y group, wherein Y is selected among the following functional groups:

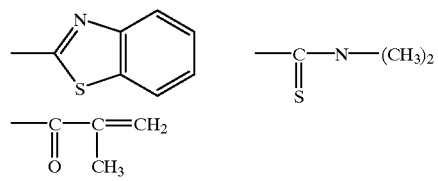

wherein R and n are as defined above and m is an integer of from 1 to 6.

Particularly preferred among them is the silane coupling agent Si69 [bis(3-triethoxysilyl-propyl)tetrasulphide] (DEGUSSA), as such or in a suitable mixture with a moderate quantity of inert filler (for instance carbon black or the same silica), so as to facilitate its incorporation into the rubber composition, or X50S (Degussa) (50% carbon black, 50% silane).

According to the invention, at least one of said first and second cross-linkable unsaturated chain polymers, is selected from the group comprising: styrene/butadiene emulsion polymerized copolymers, styrene/butadiene solution polymerized copolymers, cis 1,4-polyisoprene, natural rubber, cis 1,4-polybutadiene, styrene/isoprene copolymers, 3,4-polyisoprene, isoprene/butadiene copolymers, medium vinyl polybutadiene, styrene/isoprene/butadiene terpolymers, butyl rubber, polychloroprene, acrylonitrile/butadiene copolymers, ethylene/propylene/butadiene terpolymers, and mixtures thereof.

According to an embodiment of the invention, said step a) may be carried out by intimately mixing with said at least one first cross-linkable unsaturated chain polymer, with the first carbon black-based reinforcing filler and optionally one or more non cross-linkable ingredients, a third polymer selected from the group comprising: natural rubber and 1,4-polybutadiene, styrene/butadiene copolymers obtained in emulsion, 1,4 polyisoprene.

In a preferred embodiment of the invention, the first cross-linkable unsaturated chain polymer is a modified copolymer obtainable by polymerization of at least one conjugated diolefin with at least one vinyl aromatic hydrocarbon in the presence of an initiator comprising at least one organic metal group and subsequent modification by reacting the so obtained intermediate copolymer with a compound comprising functional groups reactive with the organic metal groups of the copolymer and derived from the initiator, said modified copolymer having a glass transition temperature of from 0° to −80° C., and comprising a total quantity of vinyl aromatic hydrocarbon of from 5% to 50% by weight based on the total weight of the same.

In a preferred embodiment of the invention, the second cross-linkable unsaturated chain polymer is, instead, a copolymer obtainable by polymerization of at least one conjugated diolefin with at least one vinyl aromatic hydrocarbon, said second polymer having a glass transition temperature of from 0° to −80° C., and comprising a total quantity of vinyl aromatic hydrocarbon of from 5% to 50% by weight based on the total weight of the same.

For the purposes of the invention, the conjugated diolefin of preferred use in said first and second copolymers is selected from the group comprising: 1,4-butadiene, isoprene, 2,3-dimethyl-1,4-butadiene, 1,4-pentadiene, 1,4-hexadiene, and mixtures thereof, while the vinyl aromatic hydrocarbon of preferred use is selected from the group comprising: styrene, α-methyl-styrene, p-methyl-styrene, vinyl-toluene, vinyl-naphthalene, vinyl-pyridine, and mixtures thereof.

Preferably, said first and second copolymers are obtained by polymerizing in solution the conjugated diolefin with the vinyl aromatic hydrocarbon. Still more preferably, said first and second copolymers are obtained by polymerizing in solution 1,4-butadiene and styrene, according to methods known per se.

In a particularly preferred embodiment, at least one of said first and said second copolymers is of the so-called "high vinyl" type, i.e. wherein at least 50% by weight of the conjugated diolefin polymerizes in 1,2-form with the vinyl aromatic hydrocarbon in such a way as to include an olefinic fraction having a 1,2-structure in a quantity of from 30% to 70% by weight to the total weight of the same.

In the following description and in the appended claims, the term: 1,2-polymerization, is used to indicate a particular stereospecific polymerization method between the conjugated diolefin and the vinyl aromatic hydrocarbon by means of which the formation of a copolymer is obtained in which the olefin fraction comprises a prefixed quantity of side-chain vinyl groups —CH=CH$_2$ bound to the polymer chain.

Methods for the 1,2-polymerization of conjugated olefins are well known in the art and are described, for instance, in U.S. Pat. Nos. 3,451,988 and 4,264,753.

More particularly, when the first copolymer is of the so-called "high vinyl" type optimum characteristics of homogeneity of the rubber composition and the best compromise between tire rolling resistance on the one hand, and good wear resistance and adequate wet skid resistance on the other hand, have been found.

This result is all the more surprising if one considers that high vinyl polymers fall among those that the prior art suggests to use in association with silica-based fillers, i.e. those fillers that are delegated to replace carbon black, but not with carbon black per se.

In this regard, see for instance the article "Comparative of the Elastomer Filler Interaction between Chemically Modified and Emulsion SBR with Carbon Black and Silica Fillers", by Ayala et al., delivered at the meeting of the American Chemical Society, Rubber Division, held in Cleveland, Ohio, U.S.A., from Oct. 17 to 20, 1995.

From the experimental tests mentioned in said article, in fact, it may be inferred that a high content of vinyl groups in the polymer base exerts a deleterious effect on the rolling resistance of the rubber compositions including carbon black, which drops to unacceptable values (see, for instance, Table VII).

Preferably, said first and second conjugated diolefin/vinyl aromatic hydrocarbon copolymers of the invention are obtained by polymerizing in 1,2-form a quantity of conjugated diolefin of from 60 to 70% by weight to the total weight of the diolefin used in the polymerization.

Preferably, furthermore, said first and second conjugated diolefin/vinyl aromatic hydrocarbon copolymers are obtained by using a quantity of vinyl aromatic hydrocarbon not greater than 25% by weight to the total weight of the conjugated diolefin and of the same hydrocarbon.

As a consequence of this, the olefin fraction of the resulting copolymers preferably comprises a quantity of 1,2-structure ranging between 40% to 60% by weight to the total weight of the same copolymer.

In the following description and in the appended claims, the term: 1,2-structure is used to indicate the part of the olefin fraction of the conjugated diolefin/vinyl aromatic hydrocarbon copolymer formed by the following repeating unit:

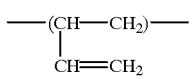

Advantageously, the rolling resistance of a tire may be adequately reduced thanks to the use of said first modified copolymer in the production process of the rubber composition.

In an embodiment, the first modified copolymer conjugated diolefin/vinyl aromatic hydrocarbon is a so-called "terminated" copolymer.

In this description, the term: "terminated" copolymer is used to indicate a copolymer obtainable by means of a polymerization reaction of the conjugated diolefin with a vinyl aromatic hydrocarbon in the presence of an organic metal initiator and by a subsequent reaction with a suitable chain-terminating compound selected from the group comprising: substituted imines, a tin halogenated compound, at least one benzophenone compound having the following structural formula:

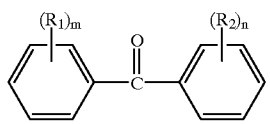

(II)

wherein R₁ and R₂ are hydrogen, halogen, an alkyl, alkenyl, alkoxy, amino, alkylamino or dialkylamino group, m and n are an integer of from 1 to 10, either individually or optionally mixed with one another.

The substituted imines of preferred use are selected from the group comprising the imines having the following structural formula:

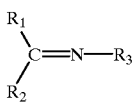

(III)

wherein R₁ and R₂ are selected from the group comprising H, alkyl, cycloalkyl, aryl, dialkylaminoaryl, aralkyl groups and aprotic O-, N- and S-containing alkyl, cycloalkyl, aryl, aralkyl groups; R₃ is selected from the group comprising alkyl, cycloalkyl, aryl, dialkylaminoaryl, aralkyl groups and aprotic O-, N- and S-containing alkyl, cycloalkyl, aryl and aralkyl groups; at least one of said groups R₁, R₂ and R₃ being a dialkylaminoaryl group, compounds in which said groups R₁, R₂ and R₃ are simultaneously aryl groups being excluded.

Benzophenone compounds suitable for the purposes of the invention may be prepared by methods known in the art, as for instance those described in U.S. Pat. No. 4,550,142.

For the purposes of the invention, the benzophenone compounds of preferred use are: benzophenone, 4,4'-bis (dimethylamino)benzophenone, 4,4'-bis(diethylamino) benzophenone, 4-diethylaminobenzophenone, 4,4'-bis (dibutylamino)benzophenone, 4,4'-diaminobenzophenone, 4,dimetylaminobenzophenone, 4,4'-diethoxybenzophenone, 3,4-dimethoxybenzophenone, 4,4'-dimethylbenzophenone, 3,3'-dicyclobenzophenone, 4-methyl-4'-methoxybenzophenone, 2,2',3,3'-tetramethylbenzophenone, 2,2'-dichlorobenzophenone, either alone or in mixture with one another.

Among the aforesaid benzophenone compounds, those having at least one amino, alkylamino or dialkylamino group on one or both the benzene rings are particularly preferred.

The terminated copolymers usable in the process of the invention may be prepared according to methods known in the art, such as for instance those described in European Patent application EP 0 451 604.

In an alternative embodiment of the invention, the first modified copolymer conjugated diolefin/vinyl aromatic hydrocarbon is a so-called "coupled" copolymer.

In the present description, the term: "coupled" copolymer is used to indicate a copolymer obtainable by polymerizing the conjugated diolefin with a vinyl aromatic hydrocarbon in the presence of an organic metal initiator and by a subsequent coupling of the polymer chains with a compound comprising a tin halogenated compound, with the primary purpose of increasing the molecular weight of the copolymer thus obtained.

Coupled copolymers of preferred use may be prepared according to methods known in the art, such as for instance those disclosed by U.S. Pat. No. 4,742,124.

Both in the case of terminated copolymers and in the case of coupled copolymers, the organic metal initiator is preferably selected from the group comprising: polyfunctional organolithium initiators, monofunctional organolithium initiators in association with polyfunctional monomers, and mixtures thereof.

Tin halogenated compounds of preferred use, on the other hand, are selected from the group comprising: dimethyl dichlorotin, dibutyl dichlorotin, tin tetrachloride, tributyl chlorotin, butyl trichlorotin, methyl trichlorotin, tin dichloride, and mixtures thereof.

A further and advantageous reduction in the tire rolling resistance may be achieved by using in the rubber composition a modified coupled and terminated copolymer, i.e. in which the copolymer obtained after coupling with the halogenated tin compound is caused to react with a suitable chain-terminating compound, such as for instance one of the aforementioned preferred compounds.

In such a case and as will be more apparent in the following description, the best results in terms of rolling resistance reduction have been observed.

In an embodiment of the invention, the second copolymer may be a copolymer suitably modified by means of silane groups Si—O— having chemical and structural features, as well as preparation techniques known per se, such as for instance those disclosed by European patent application EP-A-0 447 066.

In this case, the silica coupling agent may be used in reduced quantities or, if desired, totally eliminated.

Preferably, the second copolymer comprising silane groups has a glass transition temperature not lower than −50° C. and is obtainable by polymerization in the presence of an organic metal initiator of 1,4-butadiene or a 1,4-butadiene/styrene copolymer with a silane compound having the following structural formula:

(IV)

wherein X is a halogen atom selected from the group comprising chlorine, bromine and iodine, R and R' are independently an alkyl group, an aryl group, a vinyl group or a halogenated alkyl group having from 1 to 20 carbon atoms, j is an integer between 1 and 4, i is an integer between 0 and 2, the sum of i and j ranging between 2 and 4.

Preferably, the aforesaid silane compound comprises non-hydrolytic OR groups, i.e. the OR group is a non-hydrolytic alkoxy, aryloxy or cycloalkoxy group having from 4 to 20 carbon atoms. Preferably, the R radical in the OR group is a hydrocarbon residue wherein 3 carbon atoms are bonded to a carbon atom in α-position, a hydrocarbon residue having not less than one carbon atom which is bonded in β-position to a carbon atom or an aromatic hydrocarbon residue, such as for instance a phenyl or tolyl group.

Among the alkoxy group-comprising silane compounds suitable for the purposes of the invention, those preferred are tetrakis(2-ethylethoxy)silane, tetraphenoxy silane, methyltris(2-ethylethoxy)silane, ethyltris(2-ethylethoxy) silane, ethyltrisphenoxy silane, vinyltris(2-ethylhexylethoxy)silane, vinyltriphenoxy silane, methylvinylbis(2-ethylhexyletoxy)silane, ethylvinylbiphenoxy silane, monomethyltriphenoxy silane, dimethyldiphenoxy silane, monoethyltriphenoxy silane, diethyldiphenoxy silane, phenyltriphenoxy silane, diphenyldiphenoxy silane, and the like.

Among the aryloxy group-comprising silane compounds suitable for the purposes of the invention those preferred are tetraphenoxy silane, ethyltriphenoxy silane, vinyltriphenoxy silane, dimethyldiphenoxy silane, monoethyltriphenoxy silane, diethyldiphenoxy silane, phenyltriphenoxy silane, diphenyldiphenoxy silane, and the like.

Suitable silane compounds comprising a halogen atom and a non-hydrolytic OR group with 4 carbon atoms comprise tri-t-butoxy-monochloro silane, dichloro-di-t-butoxy silane, di-t-butoxy-diiodo silane, and the like, while suitable silane compounds comprising a halogen atom and a non-hydrolytic OR group with 5 carbon atoms comprise triphenoxymonochloro silane, monochloromethyldiphenoxy silane, monochloromethylbis(2-ethylhexyloxy) silane, monobromoethyldiphenoxy silane, monobromovinyldiphenoxy silane, monobromoisopropenylbis(2-ethylhexyloxy) silane, ditolyloxydichloro silane, diphenoxydiiodo silane, methyltris(2-methylbutoxy) silane, vinyltris(2-methylbutoxy) silane, vinyltris(3-metylbutoxy) silane, tetrakis(2-ethylhexyloxy) silane, tetraphenoxy silane, methyltris(2-ethylhexyloxy) silane, ethyltriphenoxy silane, vinyltris(2-ethylhexyloxy) silane, vinyltriphenoxy silane, methylvinylbis(2-ethylhexyloxy) silane, ethylvinyldiphenoxy silane, and the like.

Suitable silane compounds comprising a halogen atom and an OR aryloxy group include triphenoxymonochloro silane, monochloromethyldiphenoxy silane, monobromoethyldiphenoxy silane, ditolyldichloro silane, diphenoxydiiodo silane and the like.

Among these silane compounds, those wherein i is 0 or 1, in particular tetraphenoxy silane and monomethyltriphenoxy silane, are preferred.

For the purposes of the invention, the silane compounds may be used either alone or in mixture with one another.

According to the invention, the non cross-linking ingredients necessary to impart the necessary mechanical and processability characteristics to the rubber composition may be incorporated therein in one of the aforesaid mixing steps a), c) and e), or subdivided into several processing steps.

So, in an embodiment of the invention, at least one portion of the aforesaid one or more non cross-linking ingredients may be intimately mixed with the second rubber composition obtained from step e) together with the silica coupling agent, and optionally with a prefixed quantity of the first carbon black-based reinforcing filler and/or of the second silica-based reinforcing filler.

If the aforesaid one or more non cross-linking ingredients are incorporated in the rubber composition together with the silica coupling agent, it is preferable that said non cross-linking ingredients do not include substances capable of reacting with the coupling agent, such as, for instance, zinc oxide and antioxidants.

In a further variant of the invention, at least one portion of said one or more non cross-linking ingredients may be intimately mixed with the second rubber composition in step d) together with the vulcanizing system at a temperature lower than the vulcanization temperature.

The non cross-linking ingredients, known per se, are selected from the group comprising reinforcing fillers, such as for instance plasticizers, working adjuvants, antioxidants, age-retarding agents, etc.

Besides, each of these ingredients is selected in quantities and proportions easily determinable by those skilled in the art in order to obtain optimum values of the mechanical and processability characteristics of the rubber composition.

The rubber composition is also rendered vulcanizable by adding and incorporating therein a suitable vulcanizing agent, possibly and preferably accompanied by suitable activators and vulcanization accelerators.

As mentioned hereinabove, the vulcanizing agent of most advantageous use is sulfur or sulfur-containing molecules (sulfur donors), with accelerators and activators well known to those skilled in the art.

Among the vulcanization activators, preferred is zinc stearate, directly formed in the rubber composition, by adding zinc oxide and stearic acid therein.

The vulcanizing agent with the optional accelerators and activators, is incorporated in the rubber composition by submitting the latter to intimate mixing according to the methods mentioned hereinabove with reference to the preceding steps of incorporating silica and its coupling agent.

In order to prevent a premature and undesired vulcanization of the rubber composition, the temperature of the same must be controlled at values lower than values triggering vulcanization and, preferably, within a range of values of from 100° to 110° C.

To obtain a better control of the temperature, it is preferred in this case, before adding the vulcanizing agent, to discharge the rubber composition from the mixing apparatus after incorporating the coupling agent and, if advisable, to suitably cool the same.

In this step, it has been found that a mixing time of from 2.5 to 5 minutes suffices to obtain an homogeneous dispersion of the vulcanizing system (vulcanizing agent, accelerators and activators) throughout the rubber composition.

BRIEF DESCRIPTION OF THE DRAWINGS

Further features and advantages of the invention will be better apparent from the following description of some examples of realization of the process for preparing vulcanizable rubber compositions according to the invention, solely given by way of non limitative indication, with reference to the attached drawing FIGURE which shows the curves of tanδ vs temperature of a preferred rubber composition according to the invention, and of two comparative rubber compositions.

EXAMPLE 1

(Invention)

Figure 1:
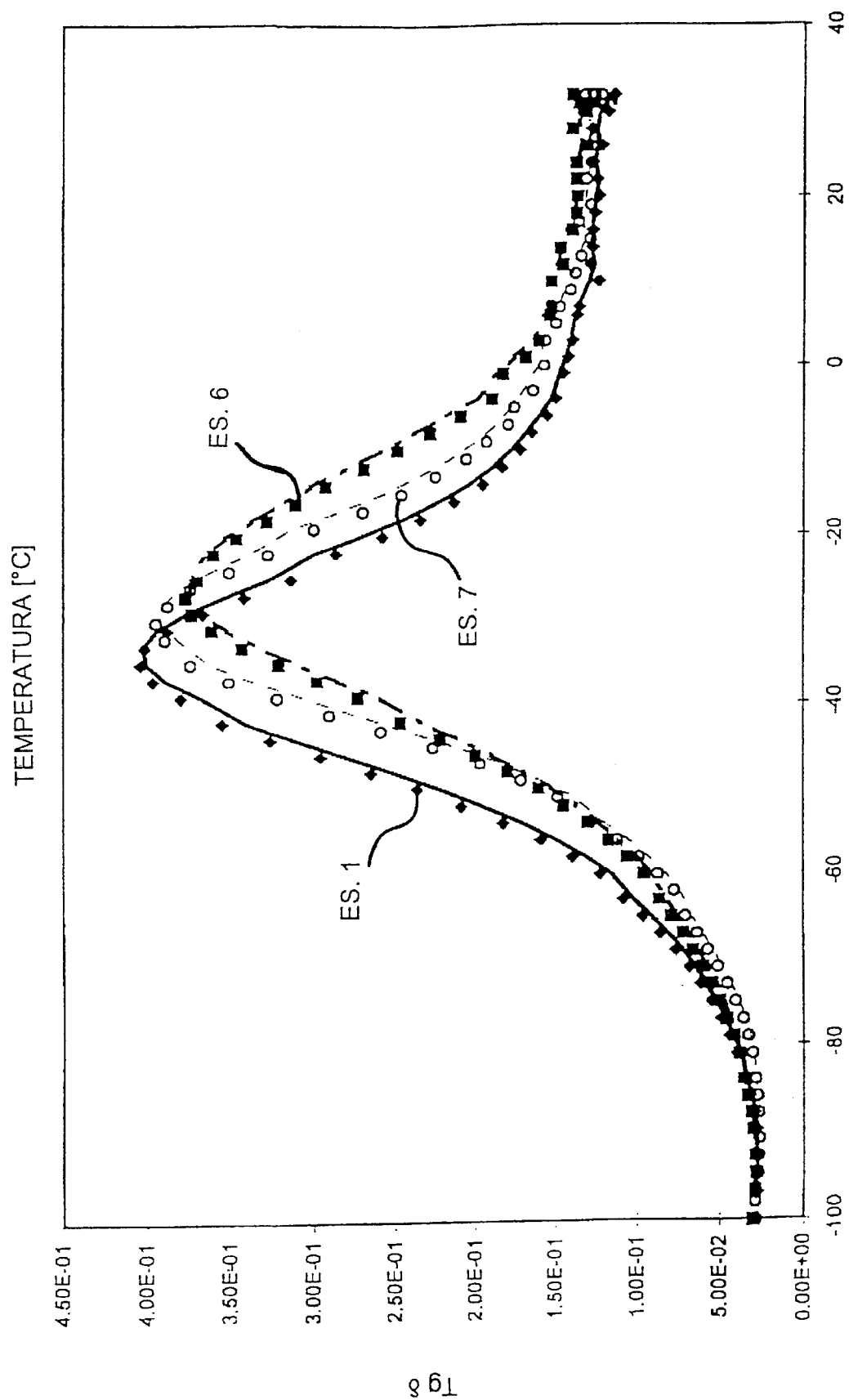

In a closed rotor mixer (Banbury) model 11D of the company POMINI, which has been caused to rotate at a speed of about 40 r.p.m., the following ingredients were loaded in sequence:

S-SBR-A=terminated and coupled butadiene-styrene copolymer prepared in solution, having a content of 1,2-structure equal to about 57% by weight, and a styrene content equal to 21% by weight, available on the market under the trade name NS116™ (Nippon Zeon);

high cis 1,4-polybutadiene available on the market under the trade name EUROPRENE™ NEOCIS (Enichem);

zinc oxide;

carbon black=Vulcan 1380™ (Cabot Corporation).

The structure and surface area characteristics of the carbon black used were the following:

DBP (ISO 4656-1): 143 ml/100 g;

compressed DBP (ISO 6894): 105 ml/100 g;

CTAB (ISO 6810): 84 m$^2$/g.

The ingredients of the rubber composition charged in this way were then thoroughly mixed for an overall time span of this first step equal to about 4 minutes.

During mixing, the mechanical work imparted to the rubber composition was controlled so as to keep its temperature at about 160° C.

In this way, a first rubber composition was obtained, in which the carbon black resulted to be homogeneously dispersed, having a Mooney viscosity, measured according to standards ISO 289-1, equal to about 120 Ms.

The high-viscosity rubber composition thus obtained was charged in a closed rotor mixer type 11D of the company POMINI, together with the following ingredients:

S-SBR-B=butadiene-styrene copolymer available on the market under the trade name BUNA VSL™ 5025-1 (Bayer);

silica=BET 175 m²/g, VN3 type (Degussa);

solid silane coupling agent including 50% carbon black, 50% bis(3-trietoxysilyl-propyl)tetrasulphide=X50S (Degussa);

age-retarding agent=6PPD, also known as SANTOFLEX™ 13 (Monsanto);

anti-fatigue agent=TMQ, also known as VULCANOX™ 4020 (Bayer), stearic acid, aromatic type oil as plasticizer, as well as other commonly used ingredients, in smaller quantities.

With regard to the silane coupling agent used, it is possible to employ alternatively silane coupling agents provided in liquid form, taking care of course to respect the quantities of each ingredient, as specified in the following Table I.

Also in this case, the rotors of the mixer were caused to rotate at about 40 r.p.m., controlling the mechanical work imparted to the rubber composition so as to keep the temperature of the same at about 150° C.

After about 4 minutes of mixing at the above temperature, a second rubber composition was obtained wherein both the polymeric phases and the reinforcing fillers (carbon black and silica) were homogeneously dispersed.

The second rubber composition was then discharged and, after cooling to room temperature, was mixed with a vulcanizing system comprising sulfur and vulcanization accelerators known per se in the art [diphenylguanidine DPG (Monsanto) and SANTOCURE™ NS (Monsanto)] in the same closed rotor mixer (Banbury) model 11D of the company POMINI, which was caused to rotate at about 20 r.p.m.

The rubber composition was then submitted to intimate mixing, so as to disperse the vulcanizing system.

After about 3 minutes of mixing, carried out taking care to keep the temperature of the rubber composition at a value equal to about 100° C., a vulcanizable rubber composition was discharged, including the ingredients shown in the following Table I.

In such Table, the parts of each ingredient are expressed in parts by weight per each 100 parts by weight of polymer base (phr).

EXAMPLE 2

(Invention)

In accordance with the procedure described in preceding Example 1, a rubber composition was prepared in which the following polymer base was used, the other ingredients being equal:

S-SBR-A'=coupled butadiene-styrene copolymer prepared in solution having a content of 1,2-structure equal to 62% by weight and a styrene content equal to 20% by weight, available on the market under the trade name SL563™ (JSR);

S-SBR-B=butadiene-styrene copolymer available on the market under the trade name BUNA VSL™ 5025-1 (Bayer);

NR=natural rubber;

high cis 1,4-polybutadiene available on the market under the trade name EUROPRENE™ NEOCIS (Enichem).

The ingredients of the resulting rubber composition are shown in the following Table I.

EXAMPLE 3

(Invention)

In a closed rotor mixer (Banbury) model 11D of the company POMINI, which has been caused to rotate at a speed of about 40 r.p.m., the following ingredients were loaded in sequence:

S-SBR-A=terminated and coupled butadiene-styrene copolymer prepared in solution, having a content of 1,2-structure equal to about 57% by weight, and a styrene content equal to 21% by weight, available on the market under the trade name NS116™ (Nippon Zeon);

high cis 1,4-polybutadiene available on the market under the trade name EUROPRENE™ NEOCIS (Enichem);

zinc oxide;

carbon black=Vulcan 1380™ (Cabot Corporation);

age-retarding agent=6PPD, also known as SANTOFLEX™ 13 (Monsanto).

The structure and surface area characteristics of the carbon black used were the same of preceding Example 1.

The ingredients of the rubber composition charged in this way were then thoroughly mixed for an overall time span of this first step equal to about 4 minutes.

During mixing, the mechanical work imparted to the rubber composition was controlled so as to keep its temperature at about 160° C.

In this way, a first rubber composition was obtained, in which the carbon black resulted to be homogeneously dispersed, having a Mooney viscosity, measured according to standards ISO 289-1, equal to about 120 Ms.

The first high-viscosity rubber composition thus obtained was charged in a closed rotor mixer type 11D of the company POMINI, together with the following ingredients:

S-SBR-B=butadiene-styrene copolymer available on the market under the trade name BUNA VSL™ 5025-1 (Bayer);

silica=BET 175 m²/g, VN3 type (Degussa) in a quantity equal to 100% of the total;

solid silane coupling agent including 50% carbon black, 50% bis(3-trietoxysilyl-propyl)tetrasulphide=X50S (Degussa);

anti-fatigue agent=TMQ, also known as VULCANOX™ 4020 (Bayer), stearic acid, aromatic type oil as plasticizer, as well as other commonly used ingredients, in smaller quantities.

With regard to the silane coupling agent used, it is possible to employ alternatively silane coupling agents provided in liquid forms, taking care of course to respect the quantities of each ingredient, as specified in the following Table I.

Also in this case, the rotors of the mixer were caused to rotate at about 40 r.p.m., controlling the mechanical work imparted to the rubber composition so as to keep the temperature of the same at about 150° C.

After about 4 minutes of mixing at the above temperature, a second rubber composition was obtained wherein both the polymeric phases and the reinforcing fillers (carbon black and silica) were homogeneously dispersed.

The second rubber composition was discharged and, after cooling to room temperature, was mixed for about 3 minutes and discharged at a temperature of about 140° C.

The rubber composition thus obtained, after cooling to room temperature, was mixed with a vulcanizing system comprising sulfur and vulcanization accelerators known per se in the art [diphenylguanidine DPG (Monsanto) e SANTOCURE™ NS (Monsanto)] in the same closed rotor mixer (Banbury) model 11D of the company POMINI, which was caused to rotate at about 20 r.p.m.

After about 3 minutes of mixing, carried out taking care to keep the temperature of the rubber composition at a value equal to about 100° C., a third vulcanizable rubber composition was discharged, including the ingredients shown in the following Table I.

In such Table, the parts of each ingredient are expressed in phr.

EXAMPLE 4

(Invention)

In accordance with the procedure described in preceding Example 1, a rubber composition was prepared in which the following polymer base was used, the other ingredients being equal:

NR=natural rubber;
IBR=butadiene-isoprene copolymer prepared in solution having a content of the two monomers of 50% by weight.

The ingredients of the resulting rubber composition are shown in the following Table I.

EXAMPLE 5

(Comparison)

A rubber composition having the same ingredients of preceding Example 1, was prepared by carrying out the second mixing step directly after the end of the first step, without allowing the rubber composition to cool down below 100° C.

It was so found that the rubber composition showed viscoelastic characteristics entirely insufficient to reach the shearing stresses suitable to disperse in an optimum manner silica throughout the polymeric matrix.

In this case, the overall time span of the two steps was equal to about 6 minutes.

The subsequent step of incorporating the vulcanizing system was carried out as described in Example 1.

EXAMPLE 6

(Prior art)

In a closed rotor mixer (Banbury) model 11D of the company POMINI, which has been caused to rotate at a speed of about 40 r.p.m., the following ingredients were loaded in sequence:

S-SBR-A=terminated and coupled butadiene-styrene copolymer prepared in solution, having a content of 1,2-structure equal to about 57% by weight, and a styrene content equal to 21% by weight, available on the market under the trade name NS116™ (Nippon Zeon);
S-SBR-B=butadiene-styrene copolymer available on the market under the trade name BUNA VSL™ 5025-1 (Bayer);
high cis 1,4-polybutadiene available on the market under the trade name EUROPRENE™ NEOCIS (Enichem);
carbon black=Vulcan 1380™ (Cabot Corporation);
silica=BET 175 m²/g, VN3 type (Degussa);
solid silane coupling agent including 50% carbon black, 50% bis (3-trietoxysilyl-propyl)tetrasulphide=X50S (Degussa);
stearic acid, aromatic type oil as plasticizer, as well as other commonly used ingredients, in smaller quantities.

The structure and surface area characteristics of the carbon black used were the same of preceding Example 1.

With regard to the silane coupling agent used, it is possible to employ alternatively silane coupling agents provided in liquid forms, taking care of course to respect the quantities of each ingredient, as specified in the following Table I.

The ingredients of the rubber composition charged in this way were then thoroughly mixed for an overall time span of this first step equal to about 5 minutes.

During mixing, the mechanical work imparted to the rubber composition was controlled so as to keep its temperature at about 150° C.

After cooling to room temperature, the rubber composition thus obtained was charged in a closed rotor mixer type 11D of the company POMINI, together with the following ingredients:

age retarding agent=6PPD, also known as SANTOFLEX™ 13 (Monsanto);
anti-fatigue agent=TMQ, also known as VULCANOX™ 4020 (Bayer),
zinc oxide.

Also in this case, the rotors of the mixer were caused to rotate at about 40 r.p.m., keeping the temperature of the rubber composition at a value equal to about 130° C.

After about 3 minutes of mixing, the rubber composition was discharged and, after cooling to room temperature, was mixed with a vulcanizing system comprising sulfur and vulcanization accelerators known per se in the art [diphenylguanidine DPG (Monsanto) e SANTOCURE™ NS (Monsanto)] in the same closed rotor mixer (Banbury) model 11D of the company POMINI, which was caused to rotate at about 20 r.p.m.

The rubber composition was then submitted to intimate mixing, so as to disperse the vulcanizing system.

After about 4 minutes of mixing, carried out taking care to keep the temperature of the rubber composition at a value equal to about 100° C., a vulcanizable rubber composition was discharged, including the ingredients shown in the following Table I.

In such Table, the parts of each ingredient are expressed in phr.

EXAMPLE 7

(Prior art)

According to the preparation methods described in European Patent application EP-A-0 763 558, a comparative rubber composition was prepared having the same ingredients of preceding Example 1, incorporating each reinforcing filler in a separate polymer.

More particularly, a comparative rubber composition was prepared according to Example 1 of European Patent application EP-A-0 763 558, having the ingredients shown in the following Table I.

In such Table, the parts of each ingredient are expressed in phr.

EXAMPLE 8

(Evaluation of the homogeneity characteristics of the rubber compositions)

A sample of the rubber compositions according to preceding Examples 1 (invention), 6 and 7 (comparison) was submitted to vulcanization using methods and apparatuses known per se, and then to several tests in order to evaluate the homogeneity properties of the polymeric phases which constitute the polymer base of the rubber composition.

More particularly, the values of tanδ were determined, tanδ being defined as:

$$tan\delta = E''/E'$$

wherein:

E''=loss modulus [MPa];
E'=elasticity modulus [MPa];

as well as the values of the elasticity modulus E', in a range of from −100° to 40° C., with experimental methods known per se and using apparatuses of the company Rheometrics available on the market.

The tests were carried out on strip-shaped test pieces having a width equal to 12±0.2 mm, a thickness equal to 2±0.2 mm and a length equal to 40 mm (useful length 24 mm), which were torsion stressed with an amplitude equal to 0.1% and a frequency of 1 Hz by means of a rheometer model "Rheometer R.D.A. 700" (Rheometrics) available on the market.

The final temperature of 40° C. was reached by submitting the test pieces to a temperature sweep at a heating rate equal to about 2° C. per minute.

The results of the tests carried out are graphically shown in the attached FIG. 1, wherein the values of tanδ (dimensionless) are reported in the ordinates, while the temperature (° C.) is reported in the abscissa.

As may be easily noticed from such FIGURE, the curve of tanδ for the rubber compositions of the invention (Example 1) shows only one peak at a temperature of about −36° C., closer to the mean weighed $T_g$ of the pure polymers of the polymer base equal to about −46° C., with respect to the comparative rubber compositions of the prior art (Examples 6 and 7), which show a peak of tanδ at a temperature of −26° C. and, respectively, of −31° C.

Therefore, in the rubber composition of the invention, the various polymeric phases were mixed with one another more homogeneously than said comparative rubber compositions.

EXAMPLE 9

(Evaluation of the variation coefficients)

Several batches of the rubber composition according to preceding Example 1 were produced at subsequent times, each batch being constituted by 15/20 charges.

From each batch a sample was then taken, and submitted thereafter to vulcanization, according to a method and with apparatuses known per se, and thereafter to several tests, in order to determine, within each batch and for all the batches, the variation coefficients of some parameters of particular significance.

The considered parameters were the following:

volumic mass (mv): measured according to standard ISO 2751;
modulus of elasticity at 100% elongation (CA1): measured according to standard ISO 37 (ring test piece);
modulus of elasticity at 300% elongation (CA3): measured according to standard ISO 37 (ring test piece);
strength at break: measured according to standard ISO 37 (ring test piece);
hardness: measured according to standard ISO 48.

Table II hereunder shows the results of the tests carried out, expressed as variation coefficients, that were the smaller the smaller the variability of the coefficients measured within each production batch.

From said table it may be inferred that the process of the invention is stable and repeatable.

EXAMPLE 10

(Determination of the dispersion homogeneity of the reinforcing fillers)

A sample of each of the rubber compositions according to preceding Examples 1, 3 and 4 (invention) and 5–7 (comparison) was submitted to vulcanization for 10' at 170° C., using methods and apparatuses known per se, and then to several tests in order to evaluate the characteristics of dispersion homogeneity of the reinforcing fillers.

Such evaluation was carried out using an optical microscope POLYVAR MET, provided with a JVC telecamera, so as to individuate filler aggregates having a size exceeding 7 μm. More specifically, a procedure of image analysis was used carried out for a total of 40 tests by means of the "Image PROPLUS" software provided by Media Cibernetics (U.S.A.).

The following Table III shows the results of the tests carried out, from which it may be inferred that in the rubber compositions of the invention (Examples 1, 3 and 4) the percentage of filler forming aggregates having a size exceeding 7 μm was lower than 0.6% with respect to carbon black, and lower than 0.9% with respect to silica, with a clear improvement over the values of the rubber composition produced according to the processes of the prior art (Examples 5–7).

In particular, the rubber compositions of Examples 5–7 do not comply with the requirement of homogeneous dispersion of the used silica, with an ensuing worsening in abrasion resistance, as will be seen later on.

EXAMPLE 11

(Determination of the dynamic properties of the rubber composition)

A sample of each of the rubber compositions according to preceding Examples 1 and 3 (invention) and 5–7 (comparative) was submitted to vulcanization for 10' at 170° C., using methods and apparatuses known per se, and then to several tests in order to evaluate the dynamic properties thereof.

More particularly, the values of tanδ were determined, with the experimental methods described hereafter and using apparatuses of the company INSTRON, available on the market.

The values of tanδ were measured by submitting a cylindrical test piece of the vulcanized rubber composition, having a length of 25 mm, a diameter of 14 mm and subjected to compression preloading up to a longitudinal deformation of 25% of its original height and kept at the prefixed temperature (0° or 70° C.), to a dynamic sinusoidal deformation of a maximum width of ±3.50% of the height under preloading, with a frequency of 100 cycles per second (100 Hz).

For the purposes of the present example, it is intended that all the mentioned values of E', E" and tanδ have been measured and should be measured according to the method described hereinabove.

The results of the tests carried out are reported in the following Table IV, wherein are reported the mean values measured on 4 tests of the loss modulus E" (MPa), of the elasticity modulus E' (MPa) and, respectively, of tangδ (dimensionless) at the temperatures of 0° and 70° C.

Taking into account that—based on the tests carried out—the wet skid resistance of the tire results to be the better the higher is the value of tangδ measured at 0° C., and that the rolling resistance results to be the lower, the lower is the value of tangδ measured at 70° C., it is easy to notice from the data reported in Table II that the rubber compositions of the invention (Examples 1 e 3) achieve comparable or higher performances both in terms of wet skid resistance and rolling resistance with respect to those provided by the comparative rubber compositions (Examples 5–7).

EXAMPLE 12

(Determination of the abradability characteristics of the rubber composition)

A sample of each of the rubber compositions according to preceding Examples 1 and 3 (invention) and 5–7 (comparison) was submitted to vulcanization using methods and apparatuses known per se, and then to several tests in order to evaluate the wear resistance characteristics thereof in terms of abradability.

The tests were carried out according to the standards DIN 53516.

Following the abradability test, 80 mm³ of material of the vulcanized rubber composition of Example 6, used as reference rubber composition, were abraded: an abradability index of 100 was then attributed to the same.

Afterwards, the volumes of material abraded from vulcanized samples of the rubber compositions of Examples 1, 3 and 7 were measured, attributing a % increase of the index the lower was the volume abraded during the test.

In other words, the lower the abradability index of the test, the better was the abrasion resistance of the rubber composition sample examined.

The results of the tests carried out are shown in the following Table V (Index AB).

The examination of the data of said Table shows that the rubber compositions of the invention (Examples 1 and 3) have abradability characteristics higher than those of the known rubber composition (Examples 5–7) and, as such, more than capable of satisfying the abradability characteristics required to a tread for vehicle tires.

EXAMPLE 13

(Road behavior)

Using the rubber compositions obtained according to preceding Examples 1 and 3 (invention) and 6–7 (comparison), several treads were produced by drawing in conventional apparatuses known per se, which treads were then employed for manufacturing tires having size 195/65 R15.

The tires so obtained were then submitted to several standard tests, in order to evaluate their rolling resistance, wet skid resistance and abrasion resistance.

A. Evaluation of rolling resistance

This evaluation was made on each tire according to the standards ISO 8767, and in particular to the so-called "Torque Method" described in point 7.2.2 of the same, using conventional laboratory apparatuses known per se.

The measurements were made at a constant speed of 80 km/h, while parasitic losses were measured according to the "Skim Reading" method described in point 6.6.1 of said standards ISO 8767.

In order to compare the rubber compositions of the invention with those of the prior art, a rolling resistance index of 100 was attributed to the power loss in kg/t measured with tires obtained from the rubber composition of comparative Example 6.

Afterwards, the power losses of the tires obtained from the rubber compositions of Examples 1, 3 and 7 were measured, attributing a % increase of the index the lower was the power loss measured during the test.

In other words, the higher the value of the index, the lower the rolling resistance of the tire examined.

The results of the tests are shown in the following Table V (Index RR).

The examination of the data shown in said Table shows that the tires of the invention (Examples 1 and 3) showed a rolling resistance better than that measured on the tires of the prior art (Examples 6 and 7).

B. Evaluation of wet skid resistance

This evaluation was carried out on the test track of Vizzola, mounting the tires onto cars Lancia K having a displacement of 2400 cm³.

All the tires were tested by a couple of independent test drivers who afterward assigned to the tires a rate from 0 to 10 for each of the following judgment parameters: effort at steering wheel, gearing promptness, curve stability (both oversteering and understeering), compliance, curve release and controllability.

In order to compare the rubber compositions of the invention with those of the prior art, an index of wet skid resistance equal to 100 was attributed to the total rate expressed for the rubber composition of comparative Example 6.

The evaluation of the tires obtained from the rubber compositions of Examples 1, 3 and 7 involved a % variation of said index depending upon the overall wet ground behavior of the tires under test.

The results of the tests carried out, expressed as mean of the evaluation expressed by the two test drivers, are shown in the following Table V (Index WSR).

As may be noticed from said Table, the tires of the invention (Examples 1 and 3) have shown performances better than those of the tires of the know art (Examples 6 and 7).

C. Evaluation of wear resistance

This evaluation was carried out mounting the tires on cars model Lancia K having a displacement of 2400 cm³ and driving for 20,000 km of a mixed course with a fully loaded car.

At the end of the 20,000 km course, the reduction in height of the tread blocks, proportional to the quantity worn off, was measured, attributing a wear resistance index equal to 100 for the tires of comparative Example 6.

The evaluation of the tires obtained from the rubber compositions of Examples 1, 3 and 7 involved a % variation of said index depending on the wear observed on the tires examined.

The results of the tests carried out are shown in the following Table V (Index WR).

As may be notice from said table, the tires of the invention (Examples 1 and 3) performed better than the tires of the prior art (Examples 6 and 7).

TABLE I

| Ingredients | Ex. 1 | Ex. 2 | Ex. 3 | Ex. 4 | Ex. 5 | Ex. 6 | Ex. 7 |
|---|---|---|---|---|---|---|---|
| S-SBR-A | 25 | 27 | 25 | — | 25 | 25 | 25 |
| NR | — | 10 | — | 30 | — | — | — |
| S-SBR-B | 50 | 46 | 50 | — | 50 | 50 | 50 |
| 1,4-polybutadiene | 25 | 17 | 25 | — | 25 | 25 | 25 |
| IBR | — | — | — | 70 | — | — | — |
| carbon black | 30 | 35 | 30 | 24 | 30 | 30 | 30 |
| silica | 30 | 35 | 30 | 56 | 30 | 30 | 30 |
| X50s | 2.4 | 2.8 | 2.4 | 4.5 | 2.4 | 2.4 | 2.4 |
| ZnO | 2 | 1 | 2 | 2.5 | 2 | 2 | 2 |
| stearic acid | 2 | 2 | 2 | 3 | 2 | 2 | 2 |
| antioxidants | 2.5 | 2.5 | 2.5 | 2.0 | 2.5 | 2.5 | 2.5 |
| sulfur | 1.5 | 1 | 1.5 | 1.4 | 1.5 | 1.5 | 1.5 |
| accelerators | 2.5 | 3 | 2.5 | 3.7 | 2.5 | 2.5 | 2.5 |
| plasticizers | 8 | 7 | 8 | 27 | 8 | 8 | 8 |

TABLE II

MEAN VALUE OF VARIATION COEFFICIENTS ($\sigma$)

| rubber composition | No. of batches | mv | CA1 | CA3 | CR | Hardness |
|---|---|---|---|---|---|---|
| Ex. 1 | 20 | 0.001 | 0.08 | 0.2 | 0.3 | 0.7 |

TABLE III

| Properties | Non-dispersed carbon black (%) | Non-dispersed silica (%) |
|---|---|---|
| Ex. 1 | 0.59 | 0.85 |
| Ex. 3 | 0.40 | 0.50 |
| Ex. 4 | 0.28 | 0.77 |
| Ex. 5 | 1.82 | 1.63 |
| Ex. 6 | 3.00 | 3.20 |
| Ex. 7 | 0.70 | 1.00 |

TABLE IV

| Properties | Ex. 1 | Ex. 3 | Ex. 5 | Ex. 6 | Ex. 7 |
|---|---|---|---|---|---|
| E' 0° C. | 15.5 | 16.0 | 16.2 | 16.3 | 16.0 |
| E' 70° C. | 6.5 | 6.7 | 6.8 | 6.3 | 6.7 |
| E" 0° C. | 8.5 | 8.7 | 8.8 | 8.5 | 8.9 |
| E" 70° C. | 1.0 | 1.1 | 1.1 | 1.2 | 1.1 |
| tan$\delta$ 0° C. | 0.540 | 0.544 | 0.541 | 0.525 | 0.546 |
| tan$\delta$ 70° C. | 0.154 | 0.164 | 0.162 | 0.189 | 0.158 |

TABLE V

| Properties | Index AB | Index RR | Index WSR | Index WR |
|---|---|---|---|---|
| Ex. 1 | 84 | 110 | 108 | 110 |
| Ex. 3 | 77 | 112 | 110 | 110 |
| Ex. 5 | 87 | n.a. | n.a. | n.a. |
| Ex. 6 | 100 | 100 | 100 | 100 |
| Ex. 7 | 91 | 100 | 100 | 105 | n.a. = not available
Index AB = DIN abradability index (the higher the worse)
Index RR = rolling resistance index (the higher the better)
Index WSR = wet-skid resistance index (the higher the better)
Index WR = wear resistance index (the higher the better)

What is claimed is:

1. A process for producing a vulcanizable rubber composition including carbon black-based and silica-based reinforcing fillers, characterized in that comprises the steps of
   a) intimately mixing at a temperature of from 130° to 180° C.:
      i) at least a first cross-linkable unsaturated chain polymer;
      ii) a first carbon black-based reinforcing filler, and optionally
      iii) one or more non cross-linking ingredients to obtain a first rubber composition having a Mooney viscosity of from 70 to 140 Ms, wherein the first carbon black-based reinforcing filler Is dispersed in a substantially homogeneous manner;
   b) cooling the first rubber composition obtained from step a) to a temperature not exceeding 100° C.,
   c) intimately mixing at a temperature of from 130° to 180° C.:
      i) the first high-viscosity rubber composition obtained from step b),
      ii) at least a second cross-linkable unsaturated chain polymer,
      iii) a second silica-based reinforcing filler, and optionally
      iv) one or more non cross-linking ingredients to obtain a second rubber composition wherein the carbon black-based and silica-based reinforcing fillers are dispersed in a substantially homogeneous manner;
   d) intimately mixing the second rubber composition thus obtained with a suitable vulcanizing system at a temperature lower than the vulcanization temperature.

2. The process according to claim 1, that further comprises the step of
   e) intimately mixing at a temperature of from 130° to 165° C. the second rubber composition obtained from step c) with at least one silica coupling agent.

3. The process according to claims 1 or 2, wherein a prefixed quantity of said first carbon black-based reinforcing filler is incorporated in at least one of steps c), d) and e).

4. The process according to claims 1 or 2, wherein a prefixed quantity of said second silica-based reinforcing filler is incorporated in at least one of steps a), d) and e).

5. The process according to claim 2, wherein the steps c) and e) of intimate mixing are simultaneously carried out at a temperature of from 140° to 165° C.

6. The process according to claim 1, wherein said step a) is carried out by intimately mixing said at least a first cross-linkable unsaturated chain polymer with a quantity of the first carbon black-based reinforcing filler of from 15 to 75 parts by weight per each 100 parts by weight of a polymer base including said at least one first and second polymers.

7. The process according to claim 1, wherein said step a) is carried out by intimately mixing said at least a first cross-linkable unsaturated chain polymer with a quantity of the first carbon black-based reinforcing filler to produce a final rubber composition having a volume electrical resistivity that does not exceed $1 \times 10^{-6}$ Ohm×cm.

8. The process according to claim 1, wherein step b) is carried out by cooling the first rubber composition obtained from step a) to a temperature lower than 40° C.

9. The process according to claim 1, wherein step c) is carried out by adding to the first high viscosity rubber composition a quantity of the second silica-based reinforcing filler of from 20 to 80 parts by weight per each 100 parts by weight of a polymer base including said at least first and second polymers.

10. The process according to claim 1, comprising keeping the weight ratio between the first carbon black-based reinforcing filler and the second silica-based reinforcing filler at a value of from 30/70 to 60/40 in step c).

11. The process according to claims 6 or 9, wherein said step c) is carried out by mixing the first rubber composition with a quantity of the second silica-based reinforcing filler such that the sum of said first and second reinforcing fillers is between 50 and 100 parts by weight per each 100 parts by weight of a polymer base including said at least one first and second polymers.

12. The process according to claim 1, wherein at least a portion of said one or more non cross-linking ingredients is intimately mixed with the second rubber composition in step d) together with said vulcanizing agent at a temperature lower than the vulcanization temperature.

13. The process according to claims 2 or 5, wherein said silica coupling agent is incorporated in the second rubber composition in a quantity of from 4 to 15 parts by weight per each 100 parts by weight of said second silica-based reinforcing filler.

14. The process according to claims 2 or 5, wherein said silica coupling agent is a silane-based coupling agent.

15. The process according to claim 1, wherein the first carbon black-based reinforcing filler has a DBP absorption value, measured according to the standards ISO 4656-1, equal to at least 110 ml/100 g, a reduction in the DBP absorption value, measured after compression according to the standards ISO 6894, equal to at least 25 ml/100 g, and a surface area, measured by CTAB absorption according to the standards ISO 6810, not greater than 120 m²/g.

16. The process according to claim 1, wherein said second silica-based reinforcing filler has a BET surface area of from 100 to 300 M2/g, a surface area, measured by CTAB absorption according to the standards ISO 6810, of from 100 to 300 M²/g, and a DBP absorption value, measured according to the standards ISO 4656-1, of from 150 to 250 ml/100 g.

17. The process according to claim 1, wherein said step a) is carried out by intimately mixing with said at least a first cross-linkable unsaturated chain polymer, with the first carbon black-based reinforcing filler and optionally with one or more non cross-linkable ingredients, a third polymer wherein said third polymer is: natural rubber and 1,4-polybutadiene styrene/butadiene, copolymers obtained in emulsion, or 1,4 polyisoprene.

18. The process according to claim 1, wherein at least one of said first and said second cross-linkable unsaturated chain polymers, is: styrene/butadiene emulsion polymerized copolymers, styrene/butadiene solution polymerized copolymers, cis 1,4-polyisoprene, natural rubber, cis 1,4-polybutadiene, styrene/isoprene copolymers, 3,4polyisoprene, isoprene/butadiene copolymers, medium vinyl polybutadiene, styrene/isoprene/butadiene terpolymers, butyl rubber, polychloroprene, acrylonitrile/butadiene copolymers, ethylene/propylene/butadiene terpolymers, or mixtures thereof.

19. The process according to claim 18, wherein the first cross-linkable unsaturated chain polymer is a modified copolymer obtainable by polymerization of at least one conjugated diolefin with at least one vinyl aromatic hydrocarbon in the presence of an initiator comprising at least one organic metal group and subsequent modification by reacting the so obtained intermediate copolymer with a compound comprising functional groups reactive with the organic metal groups of the copolymer and derived from the initiator, said modified copolymer having a glass transition temperature of from 0 to −80° C., and comprising a total quantity of vinyl aromatic hydrocarbon of from 5% to 50% by weight based on the total weight of the same.

20. The process according to claim 18, wherein the second cross-linkable unsaturated chain polymer is a copolymer obtained by polymerization of at least one conjugated diolefin with at least one vinyl aromatic hydrocarbon, said second polymer having a glass transition temperature of from 0° to −80° C. and comprising a total quantity of vinyl aromatic hydrocarbon of from 5% to 50% by weight based on the total weight of the same.

21. The process according to claims 19 or 20, wherein said conjugated diolefin is a 1,2-diolefin, and at least one of said first and second crosslinkable unsaturated chain copolymers is obtained by polymerizing at least 50% by weight of said conjugated diolefin with said at least one vinyl aromatic hydrocarbon to have a quantity of an olefinic fraction between 30% and 70% by weight of the total weight of the same in said copolymer, wherein said olefinic fraction is a 1,2-olefinic fraction.

22. The process according to claim 1, wherein the second cross-linkable unsaturated chain polymer is a copolymer comprising silane groups having a glass transition temperature not lower than −50° C. obtained by polymerization in the presence of an organic metal initiator of 1,4-butadiene or a 1,4 butadiene/styrene copolymer with a silane compound having the following structural formula:

(IV)

wherein X is a halogen atom and wherein said halogen atom is chlorine, bromine or iodine, R and R' are independently an alkyl group, an aryl group, a vinyl group or a halogenated alkyl group having from 1 to 20 carbon atoms, j is an integer between 1 and 4, i is an integer between 0 and 2, the sum of i and j ranging between 2 and 4.

23. The process according to claim 1, wherein said vulcanizing system comprises sulfur or sulfur-containing molecules and optionally at least one vulcanization accelerator.

* * * * *